Nov. 8, 1960     C W. MUSSER     2,959,065
SPLINE AND ROTARY TABLE

Filed Dec. 10, 1958     9 Sheets-Sheet 1

INVENTOR
C WALTON MUSSER
BY
ATTORNEYS

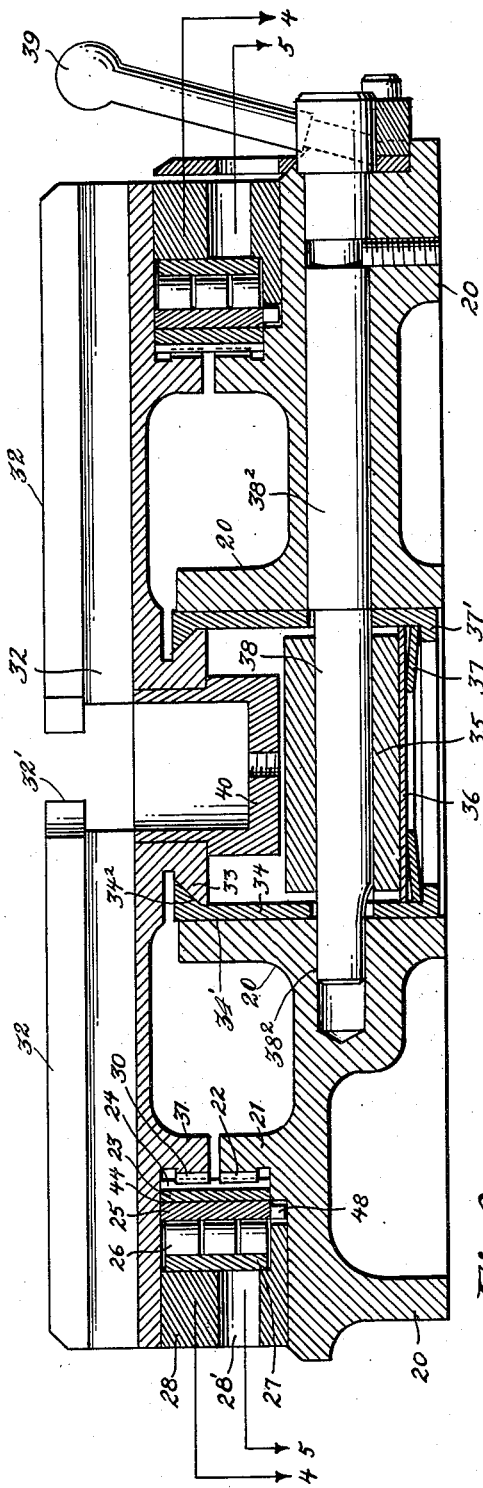
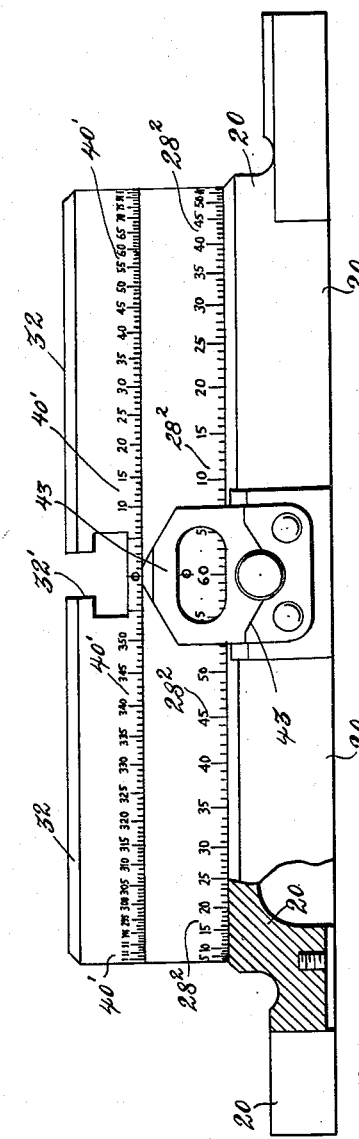

Nov. 8, 1960 C W. MUSSER 2,959,065
SPLINE AND ROTARY TABLE
Filed Dec. 10, 1958 9 Sheets-Sheet 3

INVENTOR
C WALTON MUSSER

Nov. 8, 1960  C W. MUSSER  2,959,065
SPLINE AND ROTARY TABLE
Filed Dec. 10, 1958  9 Sheets-Sheet 4

INVENTOR
C WALTON MUSSER
BY
ATTORNEYS

Nov. 8, 1960  C W. MUSSER  2,959,065
SPLINE AND ROTARY TABLE
Filed Dec. 10, 1958  9 Sheets-Sheet 5

INVENTOR
C WALTON MUSSER
BY
ATTORNEYS

Nov. 8, 1960   C W. MUSSER   2,959,065
SPLINE AND ROTARY TABLE

Filed Dec. 10, 1958   9 Sheets-Sheet 6

INVENTOR
C WALTON MUSSER
BY
ATTORNEYS

Nov. 8, 1960 C W. MUSSER 2,959,065
SPLINE AND ROTARY TABLE

Filed Dec. 10, 1958 9 Sheets-Sheet 7

INVENTOR
C WALTON MUSSER
BY
ATTORNEYS $$r_3 = r + \frac{d}{2} \sin 2\theta \qquad (1)$$

$$\theta_s = \frac{28.6\, d}{D} \cos 2\theta \qquad (2)$$

$$\theta_3/\theta = 1 - \frac{r_F}{r + \frac{d}{2} \sin 2\theta} = 1 - \frac{r_F}{r_3} \qquad (3)$$

Nov. 8, 1960    C W. MUSSER    2,959,065
SPLINE AND ROTARY TABLE

Filed Dec. 10, 1958    9 Sheets-Sheet 9

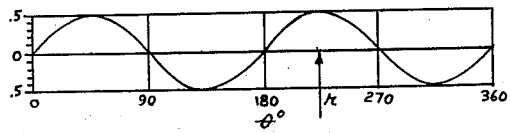
Fig. 13.

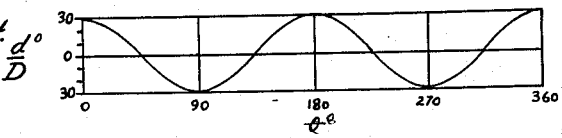
Fig. 14.

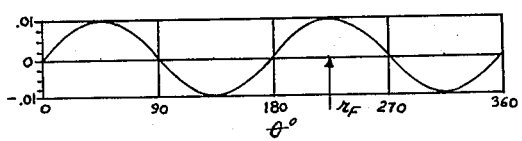
Fig. 15.

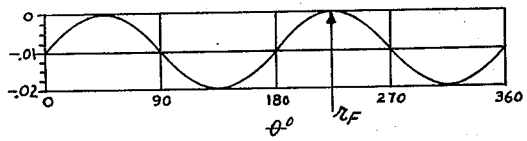
Fig. 16.

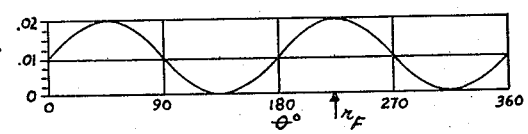
Fig. 17.

GENERATED WAVE-RADIAL DISPLACEMENT FROM CIRCLE
$r_3 = r + \frac{d}{2} \sin 2\theta$ ANGULAR DISPLACEMENT OF CIRCUMFERENTIAL POINTS BY DEFLECTING CIRCLE INTO AN ELLIPTOID
$\theta_5 = \frac{28.6 d}{D} \cos 2\theta$ RELATIVE ($\theta_3/\theta$) ANGULAR MOVEMENT OF PERIPHERAL POINTS BY ROTATING SHAPE (ADVANCING WAVE)
$\theta_3$ = ANGULAR MOTION AT $r_3$
$\frac{\theta_3}{\theta} = 1 - \frac{r_F}{r + \frac{d}{2}\sin 2\theta} = 1 - \frac{r_F}{r_3}$

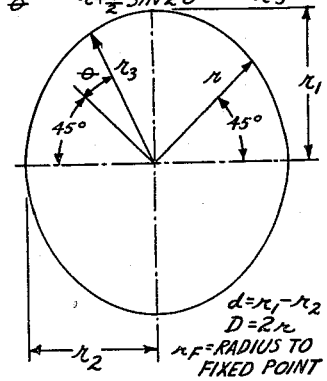

$d = r_1 - r_2$
$D = 2r$
$r_F$ = RADIUS TO FIXED POINT

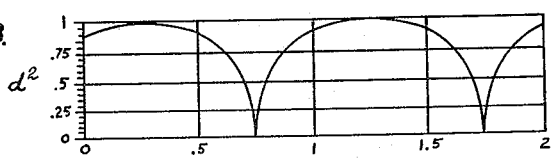
Fig. 18.

POINT MOTION COMBINATION OF THE CURVES OF FIGURES 13 AND 17.

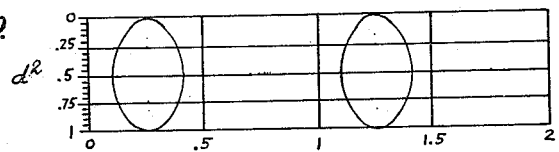
Fig. 19.

POINT MOTION COMBINATION OF THE CURVES OF FIGURES 13 AND 15.

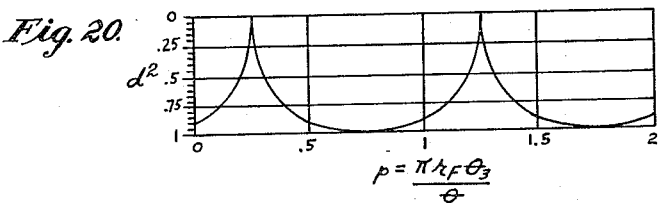
Fig. 20.

$p = \frac{\pi r_F \theta_3}{\theta}$

POINT MOTION COMBINATION OF THE CURVES OF FIGURES 13 AND 16.

INVENTOR
C WALTON MUSSER

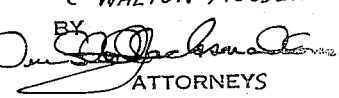
ATTORNEYS

United States Patent Office 2,959,065
Patented Nov. 8, 1960

2,959,065

SPLINE AND ROTARY TABLE

C Walton Musser, Beverly, Mass., assignor to United Shoe Machinery Corporation, Boston, Mass., a corporation of New Jersey Filed Dec. 10, 1958, Ser. No. 779,320

25 Claims. (Cl. 74—438)

The present invention relates to mechanism for precise transmission of rotary motion. It is illustrated specifically embodied in a rotary table for micrometric indexing.

A purpose of the invention is to provide a simple accurate means of micrometrically adjusting the angular position of a rotary table or other mechanism.

A further purpose is to permit rapid connection and disconnection of the micrometric adjustment without interfering with its accuracy.

A further purpose is to accomplish the adjustment by a system which has a linear relationship between input and output.

A further purpose is to avoid backlash, both in splines used in the adjustment, and in splines employed for anchorage.

A further purpose is to adjust a rotary table or the like by mechanism which is very rigid, which will stand up well under loads including impact loads and off-center loads incident to machine tool operation, which will have few parts and be easy and inexpensive to manufacture.

A further purpose is to transmit motion to a rotary element by instantaneous velocity created by rotating a deflected circular member.

A further purpose is to interconnect a deflectable spline element to one of the relatively rotatable elements by a dynamic spline which operates in response to the deflection.

A further purpose is to provide an adjustable portion in direct splined relation to one of the relatively rotatable elements and produce relative angular motion by controlled deflection of the spline.

A further purpose is to distribute the wear of the mechanism over all of the tooth surfaces rather than a very few.

A further purpose is to control intermeshing of the teeth so as to minimize wear.

A further purpose is to place a large number of teeth in intermesh so as to minimize the effect of tooth inaccuracies.

A further purpose is to provide intermeshing of the teeth at opposed sides of the structure at the greatest possible diameter to secure a rigid couple.

A further purpose is to obtain a large mechanical advantage in an adjustment device to increase the distance between graduations on the reading scale.

A further purpose is to control the tooth contact of interconnected splines in such a manner as to obtain a positive transmission of motion.

A further purpose is to utilize the angular velocity which is introduced in an elliptoidal periphery when the shape is rotated with a portion of said periphery stationary.

A further purpose is to combine different angular velocities of the periphery of an elliptoid when the shape of the elliptoid is rotated in order to obtain large mechanical advantages.

A further purpose is to adjust the elliptoidality of a wave generator or the like in order to vary the response of spline teeth or permit disengagement of said spline teeth, and preferably to control the elliptoidality in response to the direction of rotation of the wave generator.

A further purpose is to employ a cam and also a cooperating race having wave surfaces, and to provide lost motion interlocks between the two to determine the amplitude of the wave.

Further purposes appear in the specification and in the claims.

The present invention is concerned particularly with mechanisms which must precisely transmit rotary motion, although certain aspects of the invention apply generally to improved splines or gearing.

While a desirable embodiment of the invention will be applied to rotary tables, such as work tables and the like, the invention is of value wherever a rotary adjustment means is desired or positive power transmission is needed. For example, the invention may be applied to adjustable splines for attaching gears, cams or levers to a shaft in adjustable angular relationships. The invention is also applicable to dividing heads, surveying instruments, indexing heads, military fire control equipment, and gear reductions which may be built into prime movers.

The drawing, however, is particularly directed to a rotary table, since this offers a convenient illustration, whose operation is readily explained, and which clearly demonstrates the principles involved.

Figure 2 is an enlarged vertical section of Figure 1 on the line 2—2, illustrating the relationship of the internal parts.

Figure 3 is a front elevation of Figure 1 viewed along the line 3—3.

Figure 13 is a graphic representation of the generated wave form of the elliptoid of Figure 12.

Figure 14 is a graphic representation of the angular displacement occurring when the circle of Figure 12 is deflected into the elliptoid of Figure 12.

Figures 15, 16 and 17 are graphic representations of the relative angular movement which occurs when the major and minor axes of the deflected circle are rotated. In Figure 15 the deflected circle is held in such a manner that the 0°, 90°, 180° and 270° positions are fixed angularly.

In Figure 16 the major axis of the elliptoid is taken as the stationary or fixed point, and in Figure 17 the minor axis of the elliptoid is taken as the fixed point.

Figure 18 is a graphic representation of the motion of a point on the periphery of the elliptoid when the radial motion of the curve of Figure 13 is combined with motion as the result of Figure 17.

Figure 19 is a graphical representation of the motion of a point on the periphery of the elliptoid when the radial motion of Figure 13 is combined with motion as a result of Figure 15.

Figure 20 is a graphical representation of the motion of a point on the periphery of the elliptoid when the radial motion of the curve of Figure 13 is combined with motion as a result of Figure 16.

Figure 1:
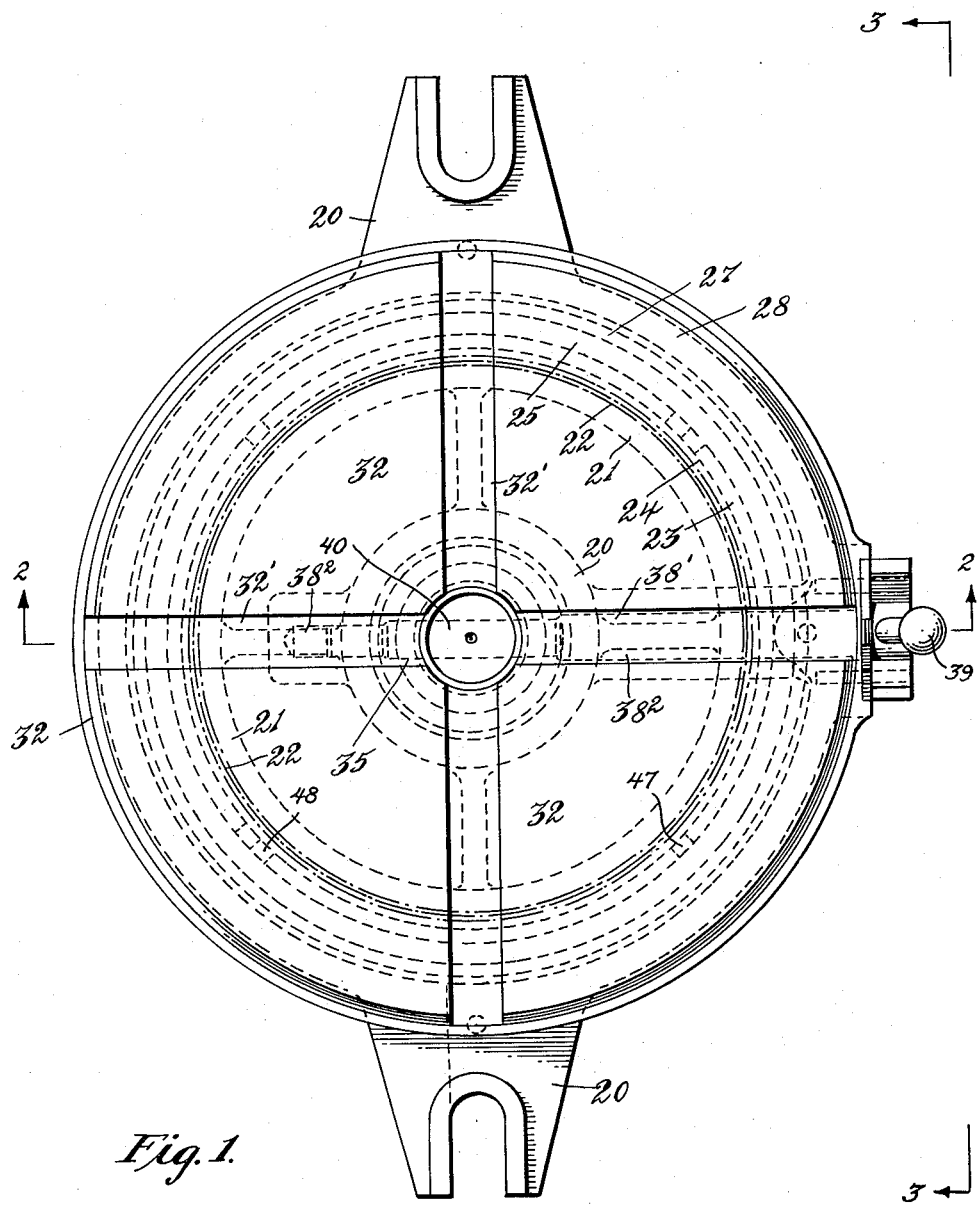
Figure 1 is a plan view of a rotary table utilizing the indexing system of the invention.
Figure 21:
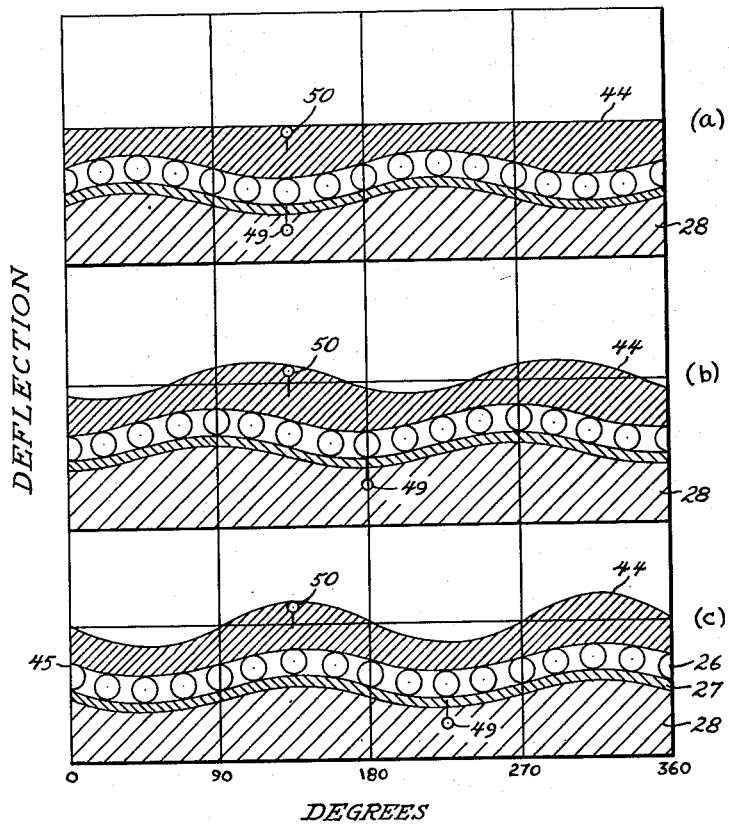

Figure 21 is a graphical representation of the adjustment and cancellation means for the generating wave, being shown in three positions, a, b and c.

In many service applications, there is need for high precision in rotary adjustment, as for example, in work tables of the type which are employed in machine tool operations, dividing and measuring heads, fire control instruments, astronomical instruments, surveying equipment, radar equipment, gun mounts, and the like.

By the present invention it is possible to obtain high degrees of precision and reproducibility of adjustment, in an extremely rugged, wear-resistant, and relatively inexpensive device.

Backlash in gear or spline teeth can be wholly eliminated, and inaccuracies due to variations in individual tooth size can be largely minimized.

The invention lends itself to the production of tremendous mechanical advantages, the application of great forces, and the support and movement of heavy objects.

Figure 12:
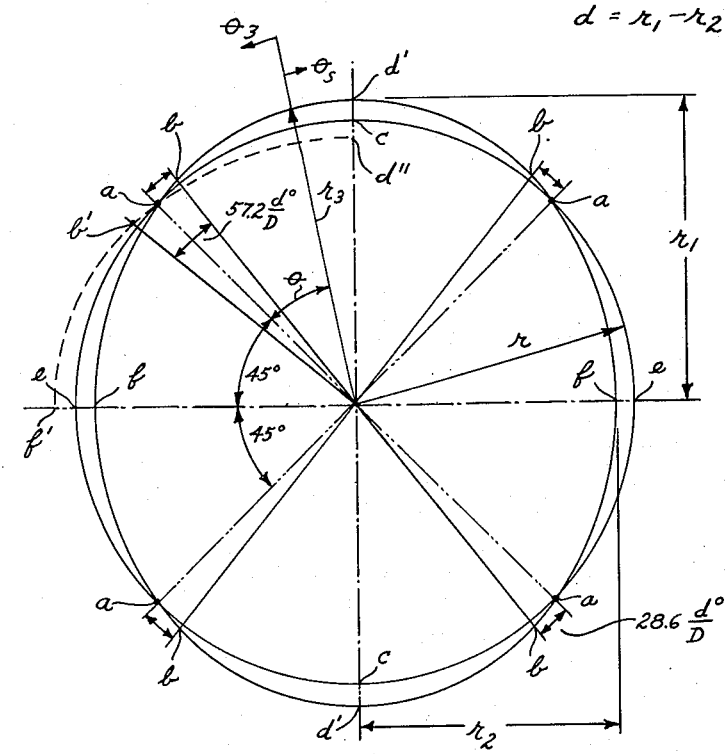
Figure 12 is a diagram which illustrates the forms and symbols used in the wave formulae.

It will be evident that if members having respective inner and outer gear or spline teeth are brought into tooth engagement at selective points by deflection of one of the gears or splines, and if the positions of engagement are caused to travel around the gears or splines, without necessarily rotating the gears or splines themselves, as will be shown in the later discussion, a wave motion is propagated which can be usefully applied either to cause rotation or to cause interengagement of opposed tooth surfaces which will prevent backlash. In accordance with the present invention in its broadest aspects, one should visualize an inner spline or gear and an outer spline ar gear, one of which, either the inner or the outer, undergoes deflection under the action of a wave generator. It must be apparent that when a gear or spline is deflected according to a wave motion, individual teeth are capable not only of moving radially but also of moving circumferentially without requiring that there be any rotational motion of the gear or spline itself. For the convenience of the present discussion, the invention is being described in connection with a rotary table. Motion transmission to the rotary table is accomplished by using the angular motion which occurs at points on the periphery of an elliptoid in the preferred embodiment, when the shape of the elliptoid is rotated within the periphery. When a circle is deflected into an elliptoidal shape, it causes an angular shift of all portions of the periphery except those which are at the major and minor axes of the elliptoid. Referring first to Figure 12, it will be seen that when the circle of radius $r$ is deflected into an elliptoid, points on the circumference between the major and minor axes shift angularly toward the major axis. This angular shift is greatest at the points directly between the major and minor axes, that is, at an angle of 45° from the axis, in Figure 12.

This angular shift of a point upon deflection of the circular shape is illustrated as the movement between point $a$ on the circumference of the circle to point $b$ on the periphery of the elliptoid, shown in very exaggerated relation in Figure 12. For an elliptoid as described herein, this shift is of maximum angle at the position at 45° from the major and minor axis, where the shift in angular distance has the value of 28.6 $d/D$ degrees, where $d=\frac{1}{2}$ the difference between the major and minor axis
= the maximum variation in $r_3$, the generating radius of the elliptoid $D=2r$, where $r=$ the radius of the circle.

At all other locations of points on the periphery, this angle, which is the angular displacement at a point on the periphery when a circle is deflected into an elliptoid, designated as $\theta_s$, is shown graphically by Figure 14.

Figure 14 plots plus and minus angular displacement as the ordinate, and degrees around the circumference as the abscissae, where $\theta$ is measured radially from the 45° position between the major and minor axis. It will be noted that at the major and minor axes there is no angular shift. At the major axis point $c$ on the circle in Figure 12 moves out to point $d'$ on the periphery of the elliptoid.

At various points in the specification, reference is made to an elliptoid. This is a curved line which has a distance $r_3$ to a common point according to the following formula:

$$r_3 = r + \frac{d}{2} \sin 2\theta \tag{1}$$

where $r=$ Radius of circle
$\theta=$ Distance which $r_3$ is displaced angularly from the position which lies 45° from the major and minor axis.

Essentially the distance $r_3$ plotted as a function of its angular displacement $\theta$ is a sine wave of two wave lengths having a peak-to-peak amplitude of $d$ with the midpoint zero line forming the 360° circumference of a circle of radius $r$. This is shown graphically in Figure 13, which plots $d$ as the ordinate, being the radial displacement of a point on a circle when deflected to form an elliptoid, against the angle $\theta$, which is the central angle the radius to the point forms with an initial position.

The shape produced is shown in Figure 12. While it is believed there are distinct manufacturing and operational advantages in using this shape, the advantages of the invention may be obtained to a considerable extent by using other shapes, and the invention is not limited to the use of the elliptoidal shape. Such other shapes, of course, will not comply exactly with the formulae outlined.

The rotation of a shape or contour while holding a point on the periphery stationary will produce angular movements of other points. Each specific shape will have its own specific relationships. For the sake of brevity, only one such shape is fully evaluated herein.

The points $b$ in Figure 12 have been angularly displaced towards the major axis when the circle of radius $r$ was deflected into an elliptoid. The extent of this angular displacement is designated by $\theta_s$ and its value for all points is given as $$\theta_s = 28.6 \frac{d}{D} \cos 2\theta \qquad (2)$$

It therefore appears that rotation of the major axis in relation to points $b$ cause these points to move angularly. For example, if point $d'$ were angularly fixed and the major and minor axes were rotated 90°, then point $d_2$ would move inward to $d''$ (at the end of the dotted line in Figure 12) and point $f$ would come to rest at $f'$. Neither $d'$ nor $f$ in these final positions is angularly displaced from the initial location. Point $b$, however, has now moved to $b'$, an angular distance of $$2\theta_s = 57.2 \frac{d°}{D}$$

This angular motion is related to the difference in the radius between the angularly fixed point and the point under observation. The actual angular movement of the point under observation, designated as $\theta_3$, in relation to the angular movement of the shape, or in other words, the angular movement of the major and minor axes, designated as $\theta$, is:

$$\frac{\theta_3}{\theta} = 1 - \frac{r_F}{r + \frac{d}{2} \sin 2\theta}$$

where $r_F$ is the radius to the fixed point on the periphery of the elliptoid, and $$\frac{\theta_3}{\theta} = 1 - \frac{r_F}{r_3} \qquad (3)$$

This relationship is shown graphically in Figures 15, 16 and 17, each of which plots as the ordinate the ratio of $\theta_3/\theta$ and as the abscissae the angles around the circumference. In Figure 15 the graduations are shown for the condition in which the periphery of the elliptoid is so held that at all times the points 45° displaced from the major and minor axes are held stationary or fixed. This can be accomplished by any of several means. One of these procedures is to deflect one end of a rotationally stationary tube into an elliptoid and progressively advance the deflection wave around the end of the tube circumferentially. Another way is to mesh splined teeth evenly spaced on the elliptoid with a stationary circular member having a number of splined teeth equal to the number of splined teeth on the elliptoid. This last is the preferred system, which is used in the example described later, and referred to herein as a dynamic spline.

Speaking generally, in one full revolution of such a dynamic spline the major axis does not produce any net angular motion around the periphery. Under these conditions all instantaneous velocities tend to cancel out and the resultant motion, considering all points, is zero. This corresponds with the graphical illustration of Figure 15.

Figure 2A:
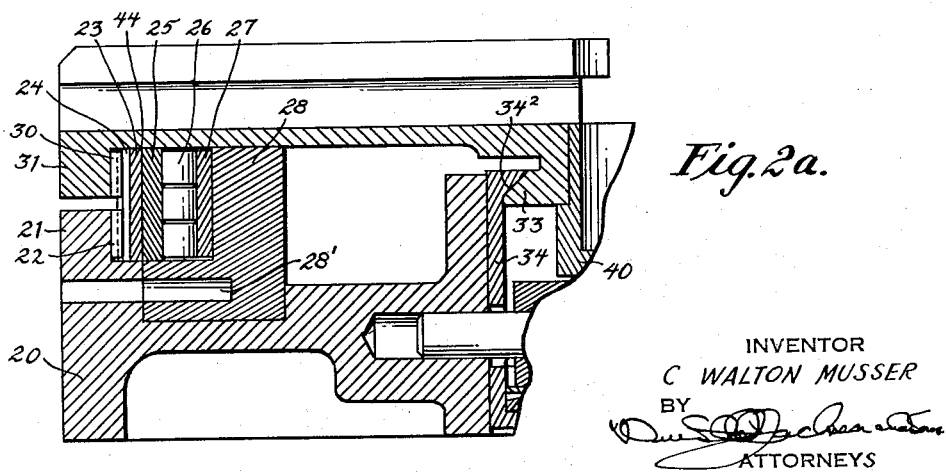
Figure 2a is a fragmentary view corresponding to Figure 2 and showing a variation.
Figure 6:
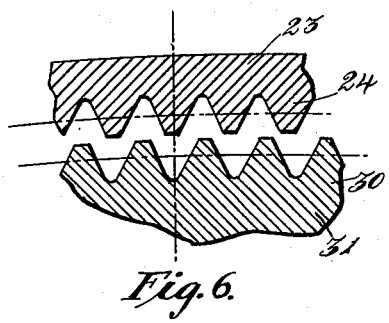
Figure 6 is an enlarged fragmentary view of a portion of Figure 4 at the major axis of the elliptoid designated by the line 6—6, showing tooth interrelationship.

Figure 16 shows the relative angular motion $\theta_3/\theta$ plotted graphically when the major axis is the point on the periphery which is angularly fixed. This is the condition that exists when the elliptoid has external teeth which mesh with a circular internal spline having the same tooth pitch and a pitch diameter equal to the teeth on the elliptoid at the major axis. This is shown in Figure 2a described below, and indicates that the principles of the invention are equally applicable whether the elliptoid is within and concentric with a mating toothed spline member, or whether the elliptoid is external and concentric with a cooperating toothed spline member.

Figure 17 shows the relative angular motion $\theta_3/\theta$ when the minor axis is the point on the periphery which is angularly fixed. When the arrangement of the toothed members is outlined in Figures 5, 10 and 11, the circular pitch on the elliptoid is the same as the circular pitch on the cooperating circular toothed member and their pitch lines are tangent at the minor axis, as exemplified by Figure 17.

Figures 18, 19 and 20 plot as ordinate the actual motion $d^2$ of a point on the periphery of the elliptoid for one revolution of the major axis, and plot as abscissae the pitch size. The quantity $d^2$ represents the motion of a specific point on the tooth for a toothed member. The angular excursion of a point in 180° rotation of the major axis is considered to be the pitch size. The motion plotted in Figures 18, 19 and 20 is the result of a combination of the radial displacement wave of Figure 13 and the relative angular motion waves of Figures 15, 16 and 17.

Figure 18 shows the combination of the motion due to the curve of Figure 13 and that due to the curve of Figure 17. This illustrates the tooth or point motion when the minor axis is held fixed. It is the tooth motion for teeth at the position indicated by line 5—5 of Figure 2.

The tooth or point motion of Figure 19 is a combination of motion due to the curve of Figure 13 and that due to the curve of Figure 15. It can be seen that for the dynamic spline previously referred to, the teeth described close curved paths and do not accomplish any net advance. Figure 19 shows the tooth motion for teeth along the position of line 4—4 of Figure 2.

The curve of tooth motion for Figure 20 is a combination of motion due to the curves of Figure 13 and Figure 16.

This represents tooth motion when the elliptoid is in tooth relation with an external ring having internal teeth with pitch diameters tangent to the major axis and with the same circular pitch as shown in Figure 2a.

If the output from any of curves shown in Figures 18, 19 and 20 were connected to two opposite points on the periphery of the elliptoid, the output would be nonuniform in angular velocity, varying from zero to maximum in sine wave or simple harmonic motion. The curve of Figure 18 would advance in one angular direction, the curve of Figure 20 would advance in the other direction, while the curve of Figure 19 would oscillate back and forth.

It will be evident that the nonuniform output referred to above can be utilized in devices which require self-locking in either direction of motion to impart such self-locking properties in a manner which does not interfere with maintenance of high operating efficiency.

Since the gear ratio can be made to vary between finite and infinite value, the device automatically becomes self-locking at the infinite value.

While certain aspects of these specific motions are embodied in other United States patent applications filed by me, the present invention is concerned with obtaining a linear relation between input and output in a preferred embodiment. To accomplish this feature, the curve of Figure 17 and the curve of Figure 15 are combined and they cooperatively function upon rotation of the elliptoid major axis. Examination of these two curves shows that at all points of rotation the difference between the two curves is a constant. As a consequence, the relation between the input and the output is linear.

Figure 4:
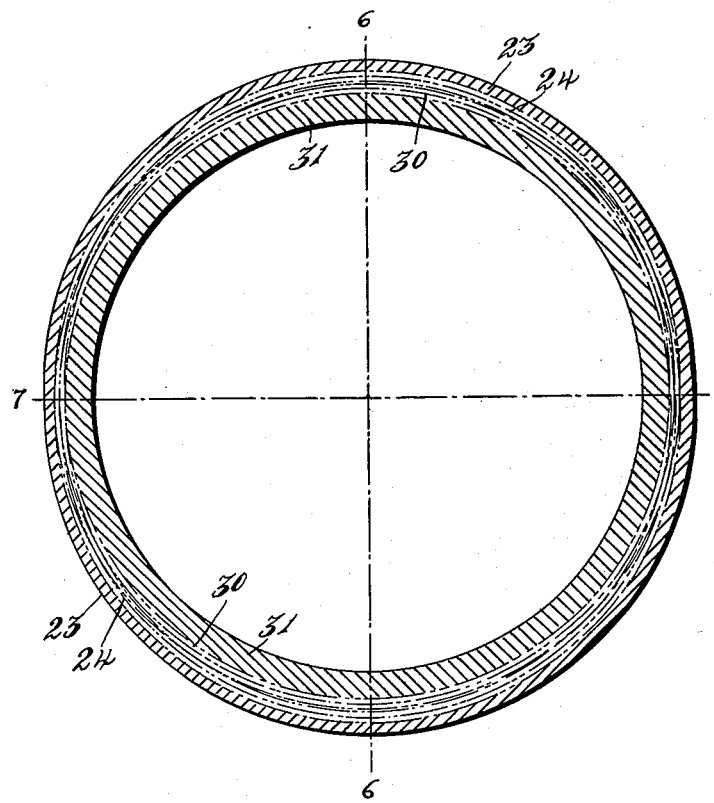
Figure 4 is a partial sectional view along the line 4—4 of Figure 2 which illustrates the pitch line relationship of dynamic spline teeth when one of the splines is elliptoidal.
Figure 5:
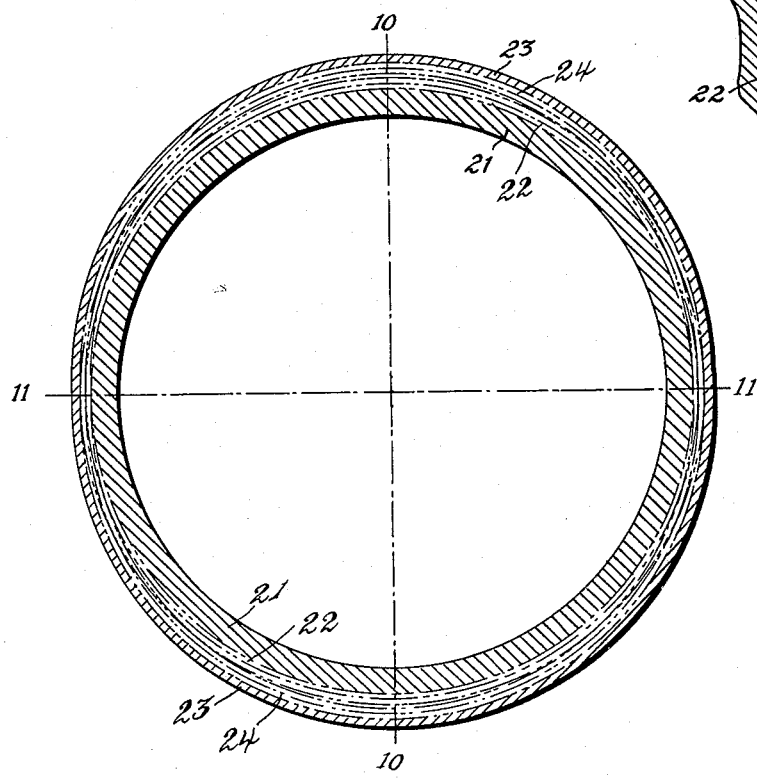
Figure 5 is a partial sectional view along the line 5—5 of Figure 2, and illustrates the pitch line relationship between two harmonic drive splines of modified tooth form when one of the splines is elliptoidal.
Figure 10A:
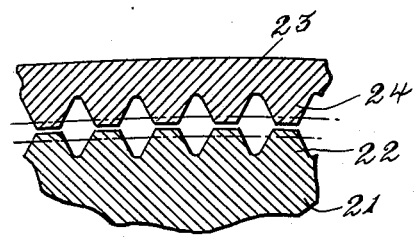
Figure 10a is an enlarged fragment of Figure 5a showing harmonic drive spline tooth interrelationship at the line 10a—10a when both splines are circular.
Figure 11A:
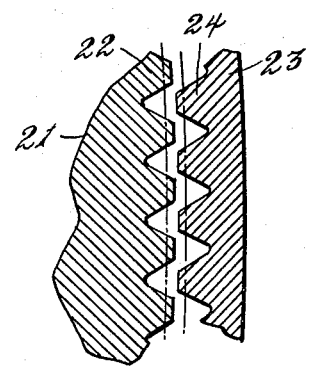
Figure 11a is an enlarged fragment of Figure 5a showing harmonic drive spline tooth interrelationship at the line 11a—11a when both splines are circular.

As referred to above, Figure 5 taken at the line 5—5 of Figure 2 uses the arrangement of Figure 17 with the minor axis of the elliptoid fixed to the base and stationary. This causes tooth movement on the elliptoid as shown in Figure 18. However, as shown at the minor axis, the teeth are fixed and stationary. These same teeth that are stationary extend upwardly into the relationship of Figure 4 shown at the line 4—4 of Figure 2, where they bear the relation of Figure 15 with respect to cooperating teeth on the rotary table. These teeth on the rotary table represent the fixed connection or zero line of curve 15. However, since the teeth on the elliptoid are stationary at this point, the cooperating teeth on the rotary table must move in relation to them to satisfy the angular movement difference between curves 17 and 15. These curves indicate that this effect takes place, and the later description will show how it is physically possible.

By rearranging the mechanical components, six separate combinations or ratios can be obtained by combining the three relative angular motion curves shown in Figures 15, 16 and 17. In each of the cases, the fixed or zero line on one curve is made to be the stationary point of reference and the fixed or zero line on the other curve is the output or driven member. Points on the curves are assumed to be coincident. Using the values indicated in the curves where $d/D$ is made equal to 0.01000000, these six ratios are as follows:

| No. | Fixed | Driven | Ratio | Reciprocal |
| --- | --- | --- | --- | --- |
| 1 | Figure 17 | Figure 16 | +.01980198 | 50.5 |
| 2 | Figure 17 | Figure 15 | +.01000000 | 100 |
| 3 | Figure 15 | Figure 16 | +.00990099 | 101 |
| 4 | Figure 16 | Figure 15 | -.01000000 | -100 |
| 5 | Figure 15 | Figure 17 | -.01010101 | -99 |
| 6 | Figure 16 | Figure 17 | -.02020202 | -49.5 |

In the above table the signs indicate the direction of rotation in reference to the major axis or shape rotation, that is, plus is the same direction and minus is the opposite direction. The reciprocal indicates the number of revolutions of the elliptoidal shape to produce one revolution of the driven element.

By way of example, a rotary indexing table will be described for the purpose of accurately rotationally indexing and positioning a work piece for machining purposes, as, for example, milling, shaping, broaching, drilling, or some other machining operation. This rotary table consists of a base plate 20 which may rest on any suitable bed, floor or foundation, having an integral rigid circular external spline or gear 21 which has teeth 22. Around this integral rigid spline 21 there is placed a flexible internal spline or wave carrier 23, having integral internal spline teeth 24 which intermesh and interengage with the teeth 22. Surrounding the wave carrier 23 is the inner race 25 of a wave generator bearing. Surrounding the inner race are roller or ball-bearing elements 26, suitably identical rollers or balls, which act as rolling or antifriction elements for the wave generator bearing.

The bearing elements 26 are surrounded and encased by an outer race 27. The outer race is suitably flexible like the inner race, and is pressed into and conforms to the shape of the interior of a cam shape wave generator 28 which is rigid and surrounds and deflects the wave generator bearing. The cam shape wave generator 28 can be rotated by any convenient means but for the purpose of the present invention I show capstan holes 28' drilled radially in the wave generator.

The spline teeth 24 of the spline or wave carrier 23 extend axially beyond the teeth of internal spline 21, and the teeth 24, retaining the same form and circumferential position, engage with spline teeth 30 of external rigid circular table spline 31 which are an integral part of the rotating work table top 32. The work table top 32 is of course suitably provided with work attachment means which may be connected in T slots 32'. The table top 32 is maintained concentric with the base plate 20 by concentric conical surface 33 on the table top and suitably integral therewith. The conical surface 33 is surrounded by a split bearing sleeve 34 whose outside diameter fits within the cylindrical portion 34' of base plate 20. The split sleeve 34 has a concentric conical portion $34^2$ which engages and journals the conical portion 33. The split sleeve 34 is capable of locking the table top 32 by drawing the table top into a position in which it clamps the wave generator 28 against the base plate 20. This is accomplished by a scotch yoke or eccentric 35 which extends radially inside the split sleeve and works at the bottom against a wear plate 36 which is compressed and urged against the scotch yoke by Bellville spring 37 which at one edge bears against the wear plate and at the other edge bears against a flange 37' on the split sleeve 34. The scotch yoke is keyed on an eccentric shaft 38 which is suitably journalled in the base plate at 38' and $38^2$ and is rotated manually by handle 39. A plug 40 in a central opening in the table functions as a dirt seal to prevent machining chips from entering the interior clamping device. This also provides a convenient means to preload the Bellville spring 37 to permit easy insertion of the eccentric shaft into the scotch yoke.

The table top 32 is circumferentially graduated with 360 graduations corresponding to the 360°, as shown at 40'. The wave generator 28 is graduated in minutes as shown at $28^2$ with each quadrant reading from 0 to 60 minutes. This graduation is provided for an overall gear ratio of 90:1, which conforms with the illustration. In this case the number of teeth on spline 21 is suitably 178, and the number of teeth on spline 23 is suitably 180. By changing the number of teeth involved, the ratio could be made to conform with some other combination. For example, the wave generator could be graduated in 600 graduations, each graduation representing ⅒ of a minute if the overall gear ratio were made 360:1. The index points for these graduations are provided on indicator 43.

Having in mind now the embodiment of the work table which has been generally described, it will be well to consider the motions which occur.

If one were to examine the motion between the wave carrier and the rigid spline in relation to normal gearing formulae, it would seem at first sight as if Figure 5, which has a different number of teeth between the mating gears, would be the portion that produces rotation, and Figure 4 where the two gears have the same number of teeth and are evidently in splined relation, would be the anchor from which the rotation caused by Figure 5 would be produced. For example, in Figure 5 the flexible spline 23 with internal teeth 24 has the same circular pitch as the teeth 22 on the rigid spline integral with the base plate. Since the pitch diameter of the flexible spline 23 is greater than the pitch diameter of the spline teeth integral with the base plate, there is a larger number of teeth in the flexible spline 23. For the example shown, there are two more teeth in the flexible spline 23 than in the rigid spline 21 integral with the base plate 20. As a consequence, when the minor axis of the cam shaped wave generator 28 is moved 180°, it causes a rotational shift of the flexible spline 23 to the fixed spline 21 a distance of one tooth.

In Figure 4, however, the circular pitch of teeth 30 attached to the table top 32 is smaller than the circular pitch of teeth 24 of the flexible spline 23. This is because there is the same number of teeth in both cooperating spline elements even though they have a different pitch diameter. Since each of these spline elements has the same number of teeth, rotation of the fully intermeshed portion of the teeth at the minor axis by rotation of the cam shaped wave generator 28 will not cause a rotational shift of teeth in one spline in relation to the teeth of the mating spline. All teeth remain in intermesh with the same teeth in the cooperating spline throughout rotation of the wave generator 28. Hence one complete rotation of the wave generator will produce no net motion of one spline in relation to the other spline.

From this analysis it might appear as if the motion is being produced by the two harmonic drive splines shown in Figure 5 which have a difference of teeth in cooperation, and that the anchoring is accomplished by the two dynamic splines in Figure 4 which have the same number of teeth in cooperation. This, however, only gives the overall net result for complete rotation of the wave generator. Close analysis will indicate that the motion at any instant is accomplished by the two cooperating dynamic splines which have the same number of teeth and that the anchor is accomplished by the two cooperating harmonic drive splines that have the different number of teeth.

Figure 10:
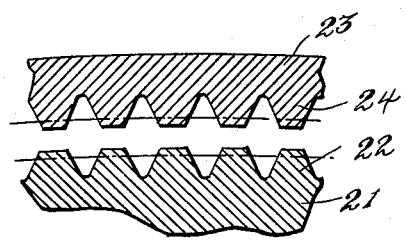
Figure 10 is an enlarged fragment of Figure 5 showing harmonic drive spline tooth interrelationship at the major axis of the elliptoid which is indicated by the line 10—10.
Figure 11:
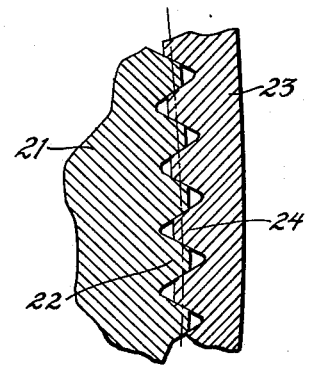
Figure 11 is an enlarged fragment of Figure 5 showing harmonic drive spline tooth interrelationship at the minor axis of the elliptoid designated by the line 11—11 of Figure 5.

Figure 11 shows the teeth intermeshing at the minor axis of Figure 5. Since the teeth of both of the harmonic drive splines are of the same pitch, they can be radially pressed into actual surface contact at both faces of the teeth. On the other hand, at 90° from this position as shown in Figure 10, the teeth are fully out of mesh and are also out of phase, as illustrated. This is brought about because there are two less teeth in the inner harmonic drive spline than in the outer. Hence, in a quarter of a revolution, or 90°, from the fully interengaged point the teeth would be a half tooth out of phase, or the teeth would be peak-to-peak.

Figure 8:
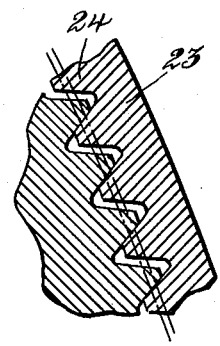
Figure 8 is an enlarged fragment of Figure 4 showing dynamic spline tooth interrelationship when the teeth are in contact only on one side.
Figure 7:
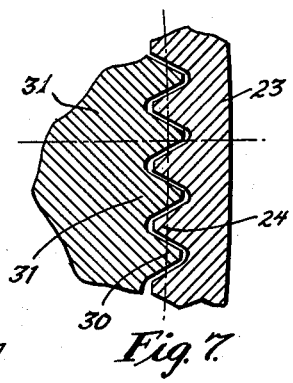
Figure 7 is an enlarged fragment of Figure 4 showing dynamic spline tooth interrelationship at the minor axis of the elliptoid on the line 7—7 of Figure 4.

Figure 7 illustrates the relationship of the teeth on the dynamic spline side of the flexible spline 23. This is at the minor axis of Figure 4. Here it can be seen that when the teeth are fully intermeshed, the faces of the teeth are not in contact. One side of these teeth comes in contact approximately 20° from this position. This is shown in Figure 8 where the teeth are in contact on one side and in Figure 9 where the teeth are in contact on the other side. This is brought about by having the teeth on the two splines provided with different circular pitch. Here, then, there is the seeming anomaly that the teeth which are most fully interengaged are not actually in contact. As a consequence, upon rotation of the cam shaped wave generator 28 around the flexible spline element 23 in a clockwise direction, the teeth of Figure 8 will tend to separate while the teeth of Figure 9 will tend to be further interengaged. This is because the minor axis, which is along line 7—7 of Figure 4 is being rotated clockwise.

Figure 9:
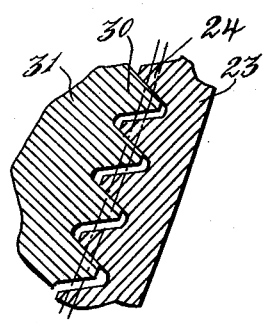
Figure 9 is an enlarged fragment of Figure 4 showing dynamic spline tooth interrelationship where the teeth are in contact only at the opposite side with respect to that shown in engagement in Figure 8.
Figure 6A:
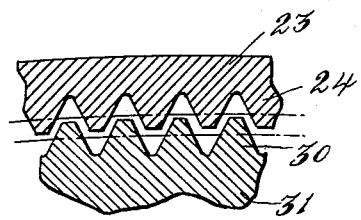
Figure 6a is an enlarged fragmentary portion of Figure 4a showing tooth interrelationship at the line 6—6 when both splines are circular.
Figure 7A:
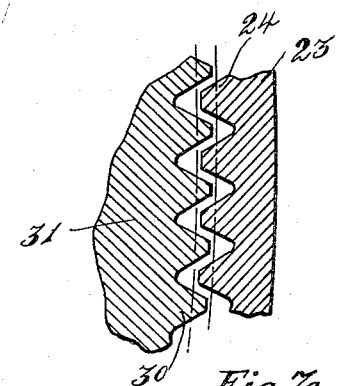
Figure 7a is an enlarged fragment of Figure 4a showing dynamic spline tooth interrelationship at the line 7a—7a when both splines are circular.

If the rotation continued for a sufficient distance so that the line 7—7 passed through the center of Figure 9, Figure 9 would then appear to be like Figure 7. From this it can be seen that Figures 8, 7 and 9 illustrate the progression of the teeth as the wave generator is rotated. From this it will be evident that in progressing from Figure 8 to Figure 9 through Figure 7 the teeth have to move from one side of the cooperating teeth over to the other side, and at Figure 7 they are in the center of this progression. Hence, the teeth of Figure 7 are actually angularly moving in relation to each other upon slight rotation of the wave generator 28.

Thus it will be evident that at the minor axis of the elliptoid, on the harmonic drive the teeth are stationary and act as an anchorage, while on the dynamic spline adjacent the minor axis the teeth are moving from engagement on one side to engagement on the opposite side, thus imparting rotational motion to the table top.

Thus if a particular tooth on the wave carrier located at the minor axis is considered, it is splined by the harmonic drive and therefore anchored, but it is relatively moving on the dynamic spline with respect to the table top.

Thus it will be evident that in a dynamic spline according to the present invention, some points on the circumference or some teeth on the wave carrier are angularly rotated, while other points on the circumference or other teeth are angularly stationary. Actually, in the elliptoidal shape, the angularly stationary teeth are at the position undergoing the most rapid radial motion of any of the teeth. This condition occurs where the teeth are at a position which crosses the circle in Figure 12, namely, for example, at 45°.

In the light of this explanation, it will be seen that when reference is made herein to a dynamic spline, it is intended to mean two spline elements with the same number of teeth interengaged at two or more suitable equally circumferentially spaced zones with intermediate zones of nonengagement, with one member gyrating in relation to the other member in such a manner as to produce desired instantaneous velocities of portions of the periphery in relation to other portions of the periphery, with the total net rotation between the two spline members remaining at zero.

Turning now particularly to the showing of Figures 1 to 3 and 21, I illustrate a means of changing the amplitude of the elliptoidality of the wave generator so as to permit rapid rotation of the table top 32 in relation to the base plate 20. This is accomplished by making the cam contour of the wave generator 28 interior elliptoidal with the major and minor axes differing by only one-half of the total desired amount. The inner race of the wave generator bearing has its outer surface 45 also made elliptoidal to an amount equal to that of the interior of the wave generator 28, while the inner surface of the inner race of the wave generator is circular. As a consequence, when the wave generator 28 and the inner bearing race 25 are in phase with each other as illustrated in Figure 21a, the inner surface 44 of the inner race of the wave generator bearing 25 is circular. This is a condition in which the major and minor axes of the elliptoid of the outside of the inner race 25 of the wave generator bearing coincides with the major and minor axes respectively of the elliptoid on the inside of the wave generator 28. For purpose of indicating this motion, an index mark 49 is shown impressed on the wave generator 28 and an index mark 50 is shown impressed on the inner race of the bearing 25.

As the wave generator 28 is rotating in relation to the inner race of bearing 25, the inner surface 44 of the inner race of bearing 25 turns into an elliptoid. Since an elliptoid as described herein is intended to be the superimposition of a sine wave of two wave lengths in 360° on a circle, the form or shape of the elliptoid remains the same regardless of the degree of rotation of the wave generator to the inner race. On the other hand, the amplitude or the difference between the major and minor axes varies with the degree of rotation. This is due to the physical law that two sine waves of the same wave length when superimposed will produce a sine wave regardless of the phase relationships of the original sine waves. This is true unless the two sine waves cancel out, in which case a circle forms.

When the wave generator 28 has been rotated 90° to the inner race of bearing 25 as shown in Figure 21c, the maximum amplitude or difference between the major and minor axes of the elliptoid is produced. This is when the minor axis of the wave generator elliptoid coincides with what was the major axis of the inner race elliptoid.

To permit the necessary relative motion between the wave generator 28 and the inner race of bearing 25, tangs 47 (Figure 1) are provided extending from the inner race of bearing 25 which engage tangs 48 on the wave generator 28. Both tangs are of such arc length that there is 90° relative motion, or play, between the tangs in one direction of rotation and the tangs in the other direction of rotation. As a consequence, when the wave generator 28 is rotated in one direction, the wave generator 28 will assume the rotative position in relation to the inner race of bearing 25 which is shown in Figure 21a. When the wave generator 28 is rotated in the other direction in relation to the inner race of bearing 25, it will assume the position shown in Figure 21c.

Figure 4A:
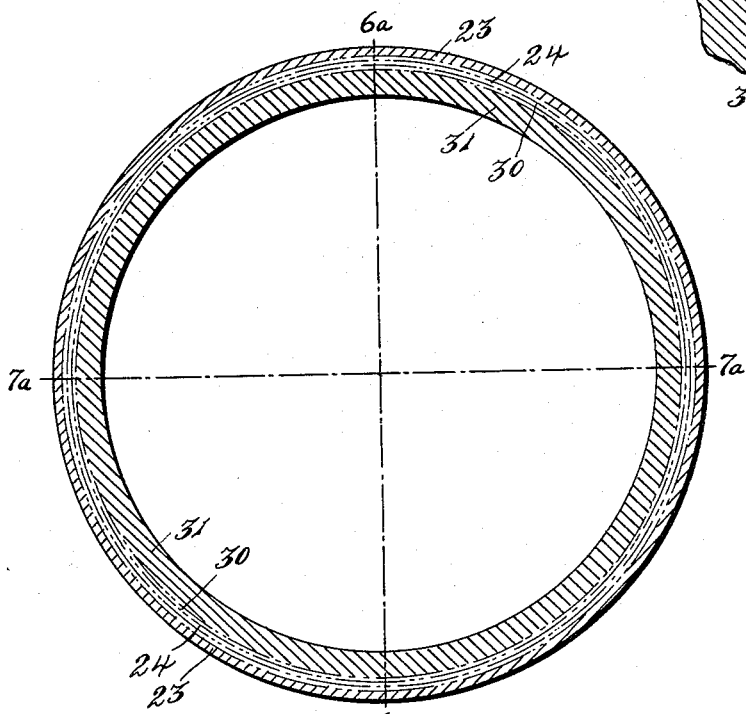
Figure 4a is a partial sectional view along the line 4—4 of Figure 2, illustrating the pitch line relationship of dynamic spline teeth when both splines are circular.
Figure 5A:
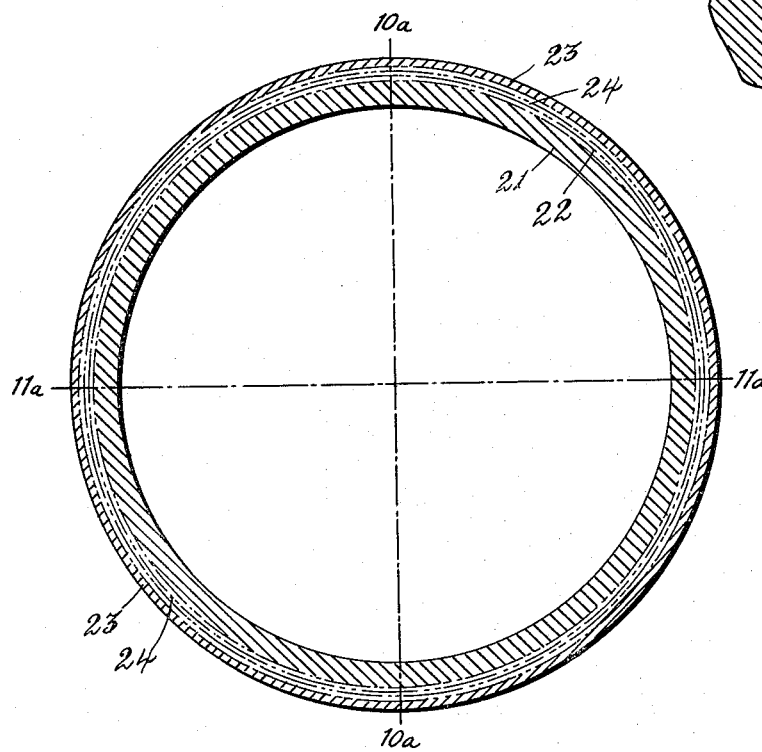
Figure 5a is a partial sectional view along the line 5—5 of Figure 2, illustrating disengagement of harmonic drive spline teeth when both splines are circular.

With the antifriction bearing element 26 interposed between the outer bearing race 27 and the inner bearing race 25, the wave generator 28 will rotate in relation to the inner race bearing 25 until such time as the tangs 48 on the wave generator 28 will engage the tangs 47 on the inner race of the bearing 25. By this arrangement, rotating the wave generator in one direction will cause the inner race of bearing 25 to change its shape to such an extent that its inner surface 44 will become circular. In this condition the cross-sectional Figures 4a and 5a represent the tooth positions or interrelationships between the various tooth members. Here it can be seen that in Figure 4a of the dynamic spline side, the teeth are still in engagement and consequently cannot rotate in relation to one another. In Figure 5a, however, it can be seen that the tooth height has been reduced to the point where the teeth will clear each other when the inner surface 44 of the wave generator bearing is circular. Under these conditions, the entire table top is free to rotate and can be rapidly positioned to the approximate location desired. Upon changing the direction of rotation of the wave generator 28, it will rotate in relation to the inner race of bearing 25 upon the antifriction bearing elements 26 until such time as the tangs 48 of the wave generator 28 engage the tangs 47 on the inner race of the bearing 25. At this time the inner surface 44 of the inner race of bearing 25 will have been converted into an elliptoid as illustrated in Figure 21c. Under these conditions the cross-sectional drawings of Figures 4 and 5 prevail. This is the working position with the teeth in proper cooperative relationship. Further rotation of the wave generator 28 will rotate the elliptoid on the inner surface of the inner race of the bearing 25 around the external surface of the flexible spline 23 and thereby cause progression of the tooth interengagement with a consequent micrometric advance of the table top 32 in relation to the base 20.

Since the teeth on the spline 21 and the wave carrier 23 advance in relation to each other as the elliptoid 28 is rotated, eventually each tooth will come into interengagement with each other tooth. Hence, by using the disconnect means illustrated herein, no additional error is introduced when the table is relocked in a new drive position. The teeth themselves are disengaged and the inaccuracies of a separate disengagement are thereby precluded.

In operation of the device, it will be evident that with the scotch yoke unlocked, the wave generator can be shifted to the disconnect position, and the table turned freely to a position approximating the desired final micrometric adjustment position. Then the direction of motion of the wave generator is reversed to create the elliptoidal wave generator effect, continuing motion causes a combination of precise gear anchorage, a high mechanical advantage through accurate dynamic spline adjustment between the wave carrier and the table top. When the final adjustment position is achieved, as determined by reading the degree and the minutes on the scales, the operator locks the device by manipulating handle 39 and thus frictionally binding the wave generator between the table top on the one hand and the base plate on the other hand.

When it is desired to release the table for a new adjustment, the locking handle is released, and then the wave generator is moved in a direction to establish the condition of Figure 21a, in which the disconnection of the splines is established, and operation can proceed as before to make a new adjustment.

In view of my invention and disclosure variations and modifications to meet individual whim or particular need will doubtless become evident to others skilled in the art, to obtain all or part of the benefits of my invention without copying the apparatus shown, and I, therefore, claim all such insofar as they fall within the reasonable spirit and scope of my claims.

Having thus described my invention, what I claim as new and desire to secure by Letters Patent is:

1. In a spline, an inner spline member having a set of exterior teeth, an outer spline member having a set of interior teeth which cooperate with the exterior teeth, there being the same number of teeth on both sets, cam means for deflecting one of the spline members to bring teeth of the two sets into contact at spaced zones around the circumference with intermediate zones of noncontact, in combination with means for rotating the cam means with respect to the spline to progress a wave of deflection around the spline.

2. In a spline, an inner spline element having a set of exterior tapering spline teeth, an outer spline element having a set of interior tapering spline teeth cooperating with the exterior spline teeth, the number of teeth in the two sets being the same, cam means having a first position for deflecting one of the spline elements to bring the teeth of the two sets into contact at circumferentially spaced zones with intermediate zones where the teeth are out of contact, and having a second position in which both spline elements are circular but the teeth remain interengaging, and means for rotating the cam means in the first position to propagate a wave around the spline.

3. A spline of claim 2, in which the teeth are in contact at four zones and out of contact at four zones when the cam means is positioned to propagate the wave.

4. In a spline, an inner spline element having a set of exterior tapering spline teeth, an outer spline element having a set of interior tapering spline teeth which cooperate with the exterior spline teeth, the teeth of the two sets being of the same number, and cam means deflecting the spline teeth of the two sets into contact at one side of the teeth at two zones around the circumference and into contact at the other side of the teeth at two zones around the circumference, with two spaced zones of noncontact where the teeth are enmeshed and two spaced zones of noncontact where the teeth are not enmeshed.

5. A spline of claim 4, in which the teeth in two spaced zones of noncontact are engaged to a lesser degree than in two other spaced zones of noncontact.

6. A spline of claim 4, in which there are two zones of tooth contact in which the teeth are in process of engaging and two spaced zones of tooth contact in which the teeth are in process of disengaging.

7. In a mechanism, a first dynamic spline element having a first set of spline teeth, a deflectable wave carrier having a second set of spline teeth which cooperate with the spline teeth of the first set, the first and second sets of spline teeth being one interior and the other exterior and there being the same number of teeth in both sets, a harmonic drive spline having a third set of teeth which cooperates with the second set of teeth on the wave carrier, the third and second sets of spline teeth being one exterior and the other interior, and there being different numbers of teeth in the third and second sets, cam means for deflecting the wave carrier to bring the second set of spline teeth into contact with the first and third sets of teeth at a plurality of circumferentially spaced zones with intermediate zones in which the teeth of the respective sets are out of contact, in combination with means for rotating the cam means around the wave carrier to propagate waves of tooth contact around the first and second set of spline teeth and also around the third and second set of spline teeth.

8. Mechanism of claim 7, in which the two of the sets of spline teeth are in contact on one side of the teeth at two circumferentially spaced zones, are in contact on the other side of the teeth at two other circumferentially spaced zones, the teeth are closely enmeshed and out of contact at two circumferentially spaced zones and the teeth are relatively far out of mesh at two other circumferentially spaced zones, and the sides of the teeth which are in contact are the sides adjoining the nearest zone in which the teeth are out of contact and closely enmeshed.

9. Mechanism of claim 7, in which the circumferential positions in which the second and third sets of spline teeth are in contact are the same as the circumferential positions at which the first and second sets of spline teeth are out of contact but closely enmesh.

10. In a mechanism, a first rigid spline element having a first set of exterior tapering spline teeth, a second flexible wave carrier spline element surrounding the first spline element and having a second set of interior tapering spline teeth, the number of spline teeth on the first and second sets being the same, a third rigid spline element within the spline teeth on the wave carrier spline element having a third set of exterior tapering spline teeth cooperating with the interior spline teeth on the wave carrier, the number of spline teeth on the second and third sets being different, the first set of spline teeth and the third set of spline teeth being coaxial and of the same pitch diameter, cam means for deflecting the wave carrier inwardly at a plurality of spaced points for bringing the first and second sets of spline teeth and the second and third sets of spline teeth into contact at a plurality of spaced zones with intermediate zones in which the spline teeth of the respective sets are out of contact, said cam means having two sine wave lengths in the circumference, and means for rotating the cam means and thereby propagating a wave around the wave carrier.

11. In a mechanism, a first spline element having a first set of spline teeth, a second wave carrier spline element coaxial with the first spline element and having a second set of cooperating spline teeth, the number of spline teeth in the first and second sets being equal, and one of the first and second sets being internal and the other external, a cam on the side of the wave carrier remote from the first spline element having a first bearing race on the side toward the wave carrier, a second bearing race on the side of the wave carrier toward the cam, and antifriction bearing elements in the space between the two races, the cam, bearing elements and the races deflecting the spline teeth on the wave carrier into engagement with the spline teeth on the first spline element at a plurality of circumferentially spaced zones with intermediate zones of, in combination with a third cooperating rigid spline element having a third set of spline teeth which cooperate with the second set of spline teeth, the number of spline teeth on the second and third sets being different, and the respective spline teeth of the second and third sets being in contact at a plurality of circumferentially spaced zones with intermediate zones in which they are out of contact.

12. In a mechanism, a first spline element having a first set of spline teeth, a second wave carrier spline element coaxial with the first spline element and having a second set of cooperating spline teeth, the number of spline teeth in the first and second sets being equal, and one of the first and second sets being internal and the other external, a cam on the side of the wave carrier remote from the first spline element having a first bearing race on the side toward the wave carrier, a second bearing race on the side of the wave carrier toward the cam, and antifriction bearing elements in the space between the two races, the cam, bearing elements and races deflecting the spline teeth of the wave carrier into engagement with the spline teeth on the first spline element at a plurality of circumferentially spaced zones with intermediate zones of non-contact, one of the races being of progressively varying thickness around the circumference, and means for adjusting said one of the races circumferentially, in one relative angular position of said race and of the cam the wave form being at a maximum amplitude and in another relative angular position of said race and of the cam the wave form being at a minimum amplitude.

13. In a spline, a first spline element having a first set of spline teeth, a second flexible spline element having a second set of spline teeth cooperating with the first set of spline teeth, cam means in spaced relation to and coaxial with respect to the second spline element, a first race interposed between the cam means and the second spline element on the side adjoining the second spline element and having varying thickness at different angular positions, the first race being deflected by the cam means, and the first race being slidable angularly with respect to the cam means, a second race on the side of the cam means toward the first race, antifriction bearing elements between the races, and lost motion interlock means between the cam means and the first race which fixes the first race angularly with respect to the cam means at one position in one direction of motion of the cam means and at another position in another direction of motion of the cam means.

14. Mechanism of claim 13, in which at one relative angular position of the cam means and the race, achieved in one direction of motion of the cam means, a wave of maximum amplitude is produced and in another relative angular position achieved in opposite motion of the cam means a wave of minimum amplitude is produced.

15. In mechanism, a first spline element having a first set of spline teeth, a second spline element having a second set of spline teeth cooperating with the first, one of the sets of spline teeth being internal and the other external, cam means extending around the spline on the side of one of the spline elements remote from the other spline element and deflecting that spline element to bring its teeth into contact with the other spline element at a plurality of circumferentially spaced zones with intermediate zones where the teeth are out of contact, said cam means being rotatable with respect to the spline, and means for clamping the cam means to maintain the position of the spline means.

16. In a spline, inner and outer first and second cooperating spline elements having respectively internal and external spline teeth, the number of spline teeth in the two sets being the same, and one of the spline elements being flexible, and means for angularly rotating portions of the periphery of one of the splines while holding a point on the periphery angularly stationary to bring certain of the spline teeth into contact while other spline teeth are out of contact, the splines at all times remaining coaxial.

17. A spline of claim 16, in combination with a third spline element having spline teeth which cooperate with the spline teeth on the flexible spline element, one of which sets of teeth being internal and the other being external, and the sets of spline teeth last mentioned being coaxial, having different numbers of teeth in the two sets, and being in contact at a plurality of angularly spaced zones and out of contact at intermediate zones.

18. In a spline, a wave carrier having a first set of spline teeth, a second set of spline teeth cooperating with the spline teeth on the wave carrier, one being internal and the other external, the number of spline teeth in both sets being the same, and the spline teeth of the two sets being of different circular pitch and of different pitch diameters, a third set of spline teeth cooperating with the second set of spline teeth, one of the second and third sets being internal and the other external, the spline teeth of the second and third sets being of the same circular pitch and of different pitch diameters, there being a different number of teeth in the second and third sets, cam means for deflecting the wave carrier to bring the sets of teeth into cooperative contact with one another at a plurality of spaced zones with intermediate zones where the teeth of the respective sets are not in contact, and means for rotating the cam means with respect to the third set of spline teeth.

19. In a spline, inner and outer cooperating spline elements having the same number of teeth and enmeshing one another, and means for deflecting the spline elements into contact at a plurality of spaced zones with intermediate zones in which the teeth are not in contact and for gyrating one spline element in relation to the other and producing instantaneous velocities of portions of the periphery in relation to other portions, while the total net rotation between the two spline elements remains zero.

20. In a work table, a base, a table top journalled on the base, a first spline on the top, a second flexible spline cooperating with the first spline, one of the first and second splines being internal and the other external, the number of teeth on the first and second splines being the same, a third spline on the base cooperating with the second spline, one of the second and third splines being internal and the other external, the number of teeth on the second and third splines being different, and cam means rotatable with respect to and operatively connected to the second spline deflecting the second spline into engagement with the first spline and the third spline at a plurality of circumferentially spaced zones with intermediate zones of nonengagement.

21. A work table of claim 20, in which the cam means is interposed between the base and the top, and locking means acting on the journal of the top for clamping the cam means in particular relative position.

22. In a work table, a base, a table top journalled on the base, a first external relatively rigid spline on the base having external teeth in a first set, a second relatively rigid spline on the table top having a second set of exterior teeth, the first spline and the second spline being coaxial and of the same diameter, a flexible third spline surrounding both the first spline and the second spline and having interior teeth which at one end cooperate with the first spline and at the other end cooperate with the second spline, the number of interior teeth on the flexible spline being the same as the number of teeth on the second spline and differing from the number of teeth on the first spline, and cam means surrounding the flexible spline and acting against the outside thereof, bringing the teeth on the inside of the flexible spline into contact with the teeth on the first spline and on the second spline at a plurality of circumferentially spaced zones with intermediate zones where the spline teeth are out of contact.

23. A work table of claim 22, in combination with an angular index on the base, an angular scale of degrees on the table top, and an angular scale of angle units less than a degree on the cam means.

24. A work table of claim 22, in combination with means for varying the elliptoidality of the deflection of said one spline in order to permit relatively rapid motion of the one spline with respect to the other.

25. In a gearing system, two gears of different pitch diameters which are coaxial and are intermeshed, there being on the circumference of the gears while they are in relative motion at least one point in which the gears are relatively stationary to one another, means for anchoring one of the gears at such relatively stationary point, in combination with means for successively maintaining different points on one of the gears relatively stationary and anchoring to such relatively stationary points.

No references cited.